April 11, 1939.　　D. H. MONTGOMERY　　2,153,971
CHUCKING MEANS
Filed July 10, 1936
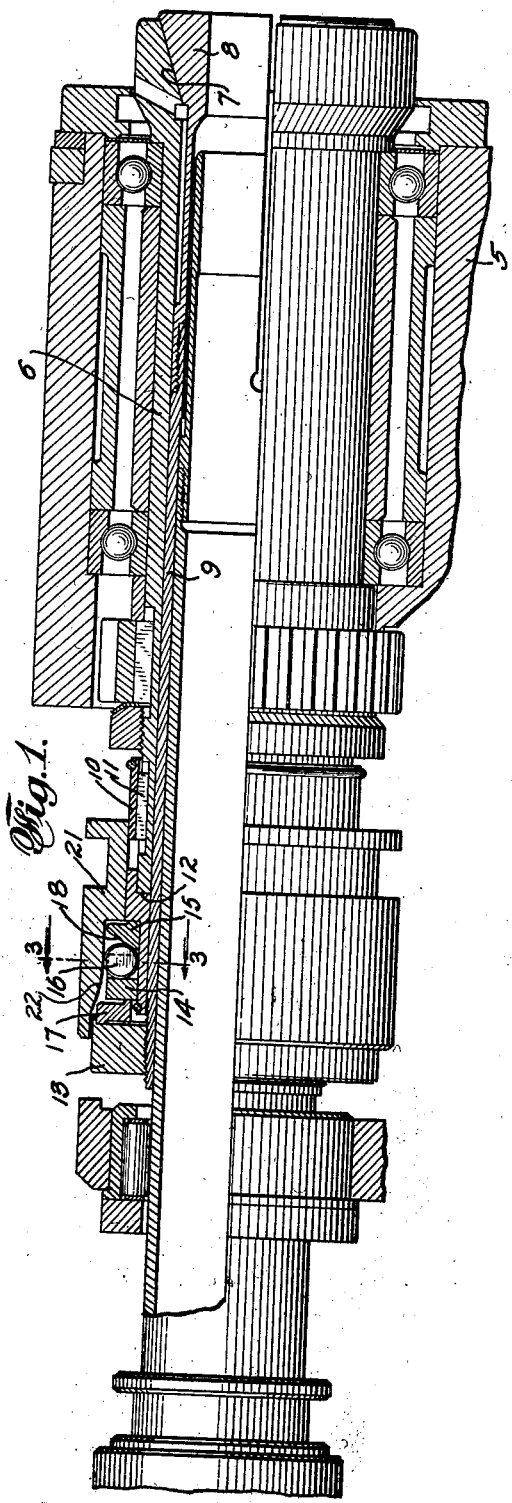
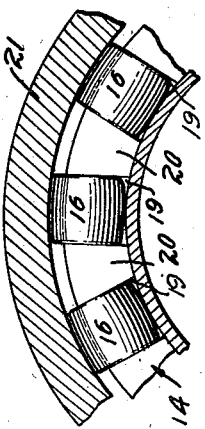
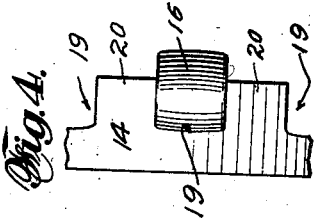
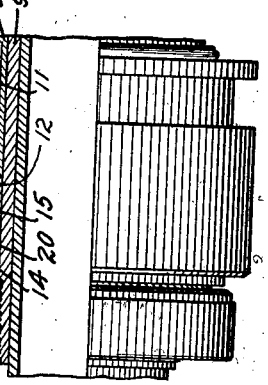
INVENTOR
DONALD H. MONTGOMERY
BY
ATTORNEYS Patented Apr. 11, 1939

2,153,971

UNITED STATES PATENT OFFICE 2,153,971

CHUCKING MEANS

Donald H. Montgomery, Hartford, Conn., assignor, by mesne assignments, to The New Britain Machine Company, New Britain, Conn., a corporation of Connecticut Application July 10, 1936, Serial No. 89,871

4 Claims. (Cl. 279—51)

My invention relates to a chucking device.

Heretofore chucking devices have been proposed involving the use of opposed abutment members having relatively inclined surfaces, one of which abutment members serves to act on a part of the spindle or chuck carrying member, while the other of said abutments acts against a chuck actuating member when wedges, such as balls, are forced between the relatively inclined surfaces of said abutments.

It is an object of the invention to provide a chuck mechanism of the above character having various features of improvement over prior devices in the way of increased efficiency, long life, safety of operation and in various structural particulars.

In the drawing which shows, for illustrative purposes only, a preferred form of the invention—

Fig. 1 is a view of a spindle carrier and spindle in longitudinal quarter section, illustrating my improved chucking mechanism, the parts being in the chuck closed position;

Fig. 2 is a fragmentary view of Fig. 1, illustrating parts in the chuck-open position;

Fig. 3 is a fragmentary enlarged sectional view, taken substantially in the plane of the line 3—3 of Fig. 1; and Fig. 4 is a fragmentary edge view of a combined abutment and wedge retainer, showing one wedging barrel roller in place.

My present invention may be said to be an improvement on the chucking means disclosed in Gridley et al. application, Serial No. 551,136, filed July 16, 1931 now Patent 2,055,435 dated September 22, 1936, and claimed in Gridley et al. divisional application, Serial No. 47,044, filed October 28, 1935.

The invention is disclosed as embodied in a multiple spindle machine, in which 5 indicates an indexible spindle carrier, which carries a plurality of rotatable spindles, such as 6. The spindle carries chucking means and in the form shown the nose of the spindle is belled, as indicated at 7, for receiving a collet 8 of the drawback type, as will be understood. A chuck actuator 9 in the form of a collet tube is secured to the collet and extends rearwardly through the spindle. The spindle may be provided at the rear with a sleeve 10, which may be keyed thereto, as by means of a key 11. The sleeve 10 is preferably shouldered at 12, to abut against the end of the body of the spindle on a shoulder thereof, so as to limit relative movement between the sleeve and spindle in one direction.

The chuck actuator 9 carries what may be termed a stop member 13, in the form of a nut threaded onto the end of the chuck actuator 11 for the purpose of adjustment, as will be later described.

For effecting chucking action I provide a pair of abutments 14—15, having relatively inclined opposed surfaces between which are interposed wedging members, preferably in the form of barrel rollers 16. The abutments 14—15 are preferably mounted on the sleeve 10 and the abutment 15 abuts a shoulder thereon, while the opposite abutment 14 serves to act upon the stop member 13 and consequently the chuck actuator, in this case through the medium of a resilient member 17 to be described. In the form illustrated the abutment 15 is an annular ring having a radially inclined surface 18 and the abutment 14 is in the form of an annular ring having a plurality of generally radial slots 19—19 cut in the face thereof and leaving spacers 20 therebetween to engage the ends of the barrel rollers for holding the same relatively to the bottoms of the slots. The bottoms of the slots are preferably curved, so as to conform in shape to the curved surfaces of the barrel rollers 16 and such curved bottoms preferably extend out substantially in a radial plane. In the preferred form the abutment 14 is formed of bronze, while the abutment 15 may be formed of a different metal, such as steel, and the barrel rollers 16 are preferably of bearing steel.

The wedging rollers are forced inwardly in a direction transversely of their axes between the relatively inclined opposed surfaces on the two abutments by means of a chucking sleeve, which has an inclined inside annular surface 22, so that when the sleeve 21 is moved toward the left the inclined annular surface 22 will force the wedging rollers 16 down between the abutments and cause the same to spread. When the sleeve 21 has been moved to its extreme left-hand position, that is, when the chuck is completely closed, the rollers engage the interior annular surface of the sleeve 21, which at this point is preferably cylindrical, that is to say, the surface is no longer tapered and the curvature of the rollers 16 is such that all said rollers contact circumferentially along an element thereof with the inside annular surface of the sleeve 21. It will be seen that, with the sleeve in the left-hand position of Fig. 1, there is no tendency for the rollers to shift the sleeve and the sleeve serves to lock the chuck closed.

In order to give a slightly yielding effect to the chuck, for example, when a bar of stock or work piece of oversize happens to be placed in the chuck, it is preferred to provide a resilient connection between the chucking or wedging means and chuck itself. In the form shown yielding effect is obtained by means of the resilient washer 17, which is preferably formed as an annular steel washer having radially spaced oppositely directed projections 23 on the opposite faces thereof. The inner projection in the form illustrated engages the abutment 14, while the outer projection engages the stop member 13 on the chuck actuating member and is held thereon by a flange or lip 24, as illustrated.

When the parts are in the position shown in Fig. 2 the barrel rollers have moved radially outwardly in the space between the abutments 14—15 and the chuck will be open. When the sleeve 21 is moved toward the left the inclined inner surface thereof will force the barrel rollers inwardly between the relatively inclined opposed abutment surfaces on the two abutments, thus spreading the same and causing the chuck to be closed. Complete movement of the sleeve 21 toward the left serves to bring the cylindrical inner surface of the sleeve into engagement with the rolls and the chuck is thus locked in closed position.

It will be noted that during the left-hand movement of the sleeve 21 the direction of pressure of the inclined surface 22 is toward the abutment 14 and inwardly. It may be shown that the best chucking effect is produced by having the abutment surface of the abutment 14 in a substantially radial plane and the bottoms of the slots 19, though they are curved to conform to the shape of the barrel rollers, in general may be said to lie substantially in a radial plane. During chucking operation, if an oversized piece is encountered, the heavy spring washer 17 is flexed and no damage is likely to be done to any of the parts.

It has been found that a bronze abutment retainer as disclosed, when used with steel barrel rollers, is substantially wear resistant and barrel rollers have been found to be very effective as wedging elements, both from the point of view of strength and wearing qualities. Any wear, as will be understood, can be taken up by adjustment of the stop nut 13 on the chuck actuating member.

While the invention has been described in considerable detail and a preferred form shown, it is to be understood that various changes and modifications may be made within the scope of the invention as defined in the appended claims.

I claim:

1. A chucking mechanism, comprising a pair of opposed abutments, barrel rollers interposed between said abutments, said abutments having opposed relatively inclined abutment surfaces thereon, the surfaces on one of said abutments being arcuately shaped to fit the curved contour of said barrel rollers throughout substantially the length of one element thereof and having spacer means thereon to engage the ends of said barrel rollers for holding the same on said relatively curved abutment surfaces, and a sleeve member having an inclined surface for engagement with said barrel rollers for forcing the same in a direction transversely of their axes between said abutments, for the purpose described.

2. In a chuck actuating mechanism, a pair of opposed abutments, one of said abutments having a plurality of slots therein, barrel rollers in said slots, the bottoms of said slots being curved to conform to the shape of said barrel rollers and the sides of said slots serving to engage the ends of said barrel rollers for spacing the same circumferentially and holding the same relatively to said curved abutment surfaces, the other of said abutments having a substantially continuous surface inclined relatively to the opposed surfaces on said other abutment, said barrel rollers being seated on said curved abutment surfaces and held as aforesaid and engageable with said substantially continuous surface inclined relatively to the surface on said other abutment, and means for forcing the said barrel rollers in a direction transversely of their axes inwardly between said abutments.

3. In a chucking means, a pair of opposed abutments, barrel rollers interposed between said abutments and circumferentially disposed thereabout, a chucking sleeve having an inclined surface for forcing said barrel rollers in a direction transverse to their axes between said abutments, said sleeve having a cylindrical holding surface thereon of substantially the same curvature as the curvature of said barrel rollers, whereby when said sleeve is in holding position for holding said barrel rollers in wedging position between said abutments said cylindrical surface will substantially contact the surfaces of all said barrel rollers along the curved contour thereof.

4. In a device of the character indicated, a rotatable spindle, a chuck carried thereby, a chuck actuator extending rearwardly therein, a sleeve held against movement in one direction on said spindle, a pair of abutments on said sleeve and having opposed relatively inclined surfaces, barrel shaped rollers interposed between said surfaces, a stop member on said chuck actuator, said abutments serving, respectively, to act on said sleeve and consequently said spindle and on said stop member on said chuck actuator for moving the same relatively to each other for closing said chuck, means for moving said rollers transversely of their axes between said abutments, and resilient means interposed between one of said abutments and the member upon which it acts, for the purpose described.

DONALD H. MONTGOMERY.